United States Patent [19]

Kobayashi et al.

[11] Patent Number: 4,782,585

[45] Date of Patent: Nov. 8, 1988

[54] GRID FOR LEAD STORAGE BATTERY AND METHOD FOR ITS PRODUCTION

[75] Inventors: Kenji Kobayashi, Kanagawa; Tetsunari Kawase, Chigaskai; Sadao Furuya, Hiratsuka; Hiroshi Yasuda, Fujisawa, all of Japan

[73] Assignee: Matsushita Electric Industrial Co., Ltd., Osaka, Japan

[21] Appl. No.: 425,256

[22] Filed: Sep. 28, 1982

[30] Foreign Application Priority Data

Oct. 1, 1981 [JP] Japan .................................. 56-157076
Jan. 21, 1982 [JP] Japan .................................... 57-8360

[51] Int. Cl.$^4$ ............................................. H01M 4/72
[52] U.S. Cl. ................................... 29/623.5; 29/2; 427/433; 429/211; 429/234; 429/245
[58] Field of Search ............... 429/234, 241, 245, 209, 429/211; 29/623.5, 2; 427/433, 431, 430.1

[56] References Cited

U.S. PATENT DOCUMENTS

| | | | |
|---|---|---|---|
| 1,509,186 | 9/1924 | Benner et al. | 429/163 |
| 2,064,324 | 12/1936 | Schnaubelt | 429/241 |
| 2,694,099 | 11/1954 | Zahn | 429/234 |
| 3,269,863 | 8/1966 | Helms | 429/211 |
| 3,275,473 | 9/1966 | Barnett et al. | 429/211 |
| 3,516,863 | 6/1970 | Willmann et al. | 429/234 X |
| 3,516,864 | 6/1970 | Willmann | 429/234 X |
| 3,751,288 | 8/1973 | Alfrey, Jr. et al. | 427/431 X |
| 3,813,300 | 5/1974 | Shima et al. | 429/234 X |
| 4,121,024 | 10/1978 | Turillon et al. | 429/245 |

*Primary Examiner*—Anthony Skapars
*Attorney, Agent, or Firm*—Stevens, Davis, Miller & Mosher

[57] ABSTRACT

A grid has a grid structure (11) made of acid proof synthetic resin. A grid rib structure constitutes the grid structure and part of the grid rib structure inclusive of at least a connector lug (12) and a portion contiguous thereto is immersed in molten lead or lead alloy to form a lead or lead alloy film (16) coated on the grid structure. The portion to be coated with the lead or lead alloy film includes part of a frame rib (13) and an active material support rib (14, 15) which constitute the grid rib structure, and the active material support rib constituting the grid mesh is partly cut off (18) to enhance the coating of the lead or lead alloy film, the reduction in weight of the grid and ease of working for the coating of the lead or lead alloy film on the grid structure.

8 Claims, 3 Drawing Sheets

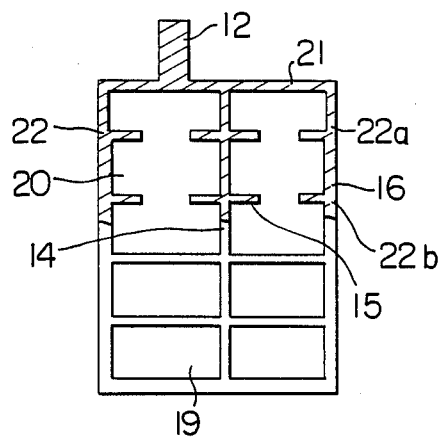
FIG. 7
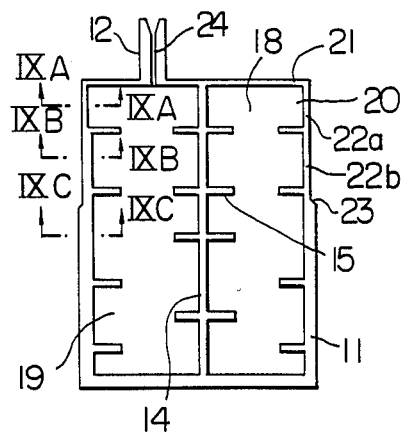
FIG. 8
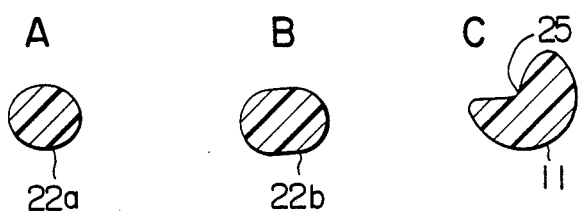
FIG. 9
FIG. 11
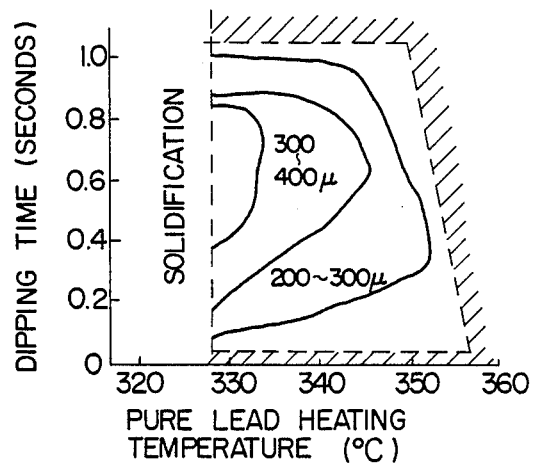

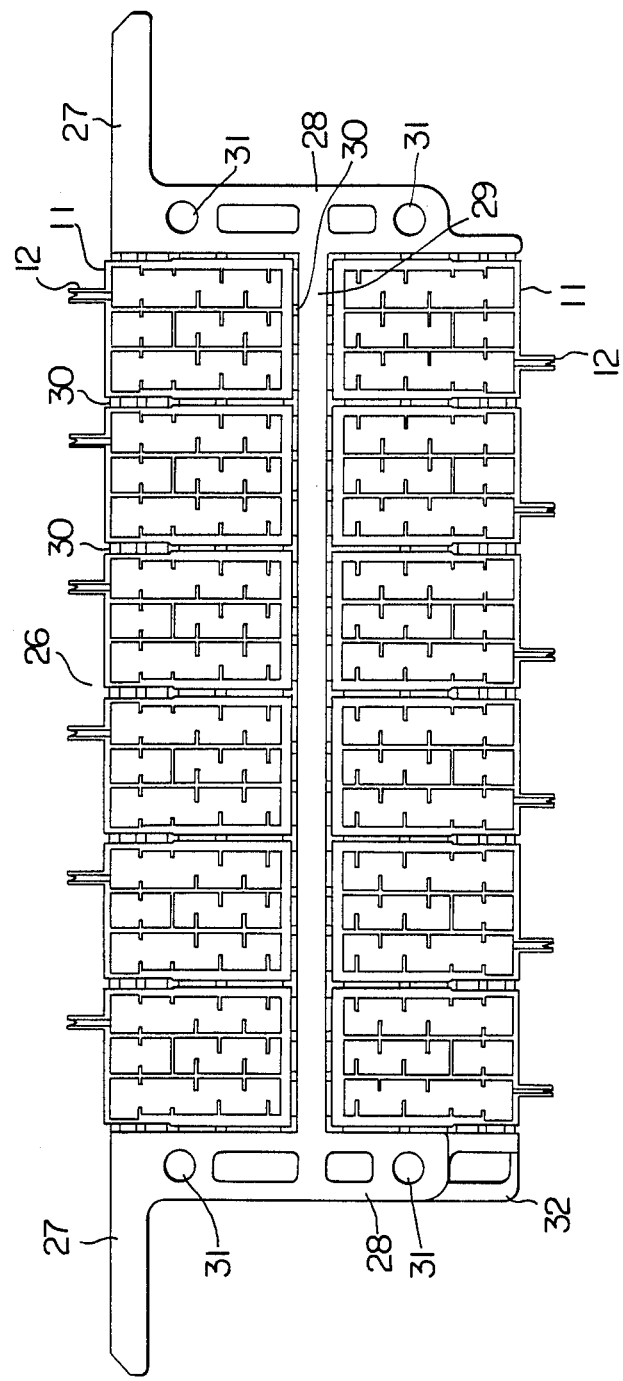

GRID FOR LEAD STORAGE BATTERY AND METHOD FOR ITS PRODUCTION

BACKGROUND OF THE INVENTION

The present invention relates to an improvement of a grid for use in a lead storage battery.

Today there is a great desirability for a reduction in weight of lead storage batteries in order to improve the fuel economy in automobiles fitted with a storage battery, to increase the running distance performance of electric powered vehicles, and to improve portability of portable devices.

In typical lead storage batteries, the grid is produced by casting lead alloy. In spite of efforts to reduce the weight of the grid of the material having a large specific gravity of, for example, 11.3 for pure lead by making the grid thin, technical difficulties are still encountered in the production of a grid of 1 mm or less thickness by casting. In addition, the thin grid tends to be deformed in the subsequent paste filling process or curved during handling. For these reasons, the reduction in weight of the cast grid is limited.

In the past, therefore, it has been devised to partly exchange the lead alloy with synthetic resin having about 1/10 of the specific gravity of lead alloy to reach various types of a so-called composite grid of lead alloy and synthetic resin wherein lead alloy is used for only the portion which is required to be conductive and synthetic resin is used for the portion which is exclusively adapted to support active materials.

For example, in a lead alloy/synthetic resin composite grid disclosed in (A)Japanese Patent Kokai (Laid-open) No. 8037/75, the portion of grid required to be conductive is first cast with lead alloy, and the cast portion is then inserted in a matrix for synthetic resin moulding and synthetic resin is poured in the matrix to form, by moulding with synthetic resin, the portion for support of the active materials which unite with the lead alloy portion.

Disclosed in (B) Japanese Utility Model Publication No. 3535/68 is another lead alloy/synthetic resin composite grid wherein a grid of synthetic resin and a perforated plate of lead alloy are laminated and bonded together.

The production process for each of the above composite grids is, however, complicated and in addition, the composite grid having the conductive portion of lead alloy in the form of slender ribs or a thin plate tends to be curved or deformed and is therefore difficult to handle. Accordingly, these composite grids are successful in reducing weight to a certain extent but they suffer from poor producibility and are unsuited for mass production.

Further, a composite grid produced by a metal spraying process has also been proposed wherein fine particles of molten lead are sprayed at high speed onto the surface of a grid of synthetic resin to penetrate the synthetic resin grid surface and be held therein. This composite grid can advantageously be produced with simplified equipment but on the other hand, the utilization efficiency of the sprayed molten lead is poor in the metal spraying process. And, the film thickness becomes irregular and especially, the film has a small-thickness portion in which intimacy with the synthetic resin grid is poor so that the lead particles remain as they are, resulting in a porous coating. Accordingly, the lead particles per se covering the synthetic resin grid are easily reacted with and are liable to be turned into an active material and hence, from the standpoint of the function of collecting current from the paste active material, electrical resistance is increased and the composite grid used as a plate of storage battery is degraded in voltage characteristics and life.

SUMMARY OF THE INVENTION

A grid for a lead storage battery according to the present invention is produced by immersing a grid structure of synthetic resin into molten lead and then pulling up the grid structure rapidly or by pouring molten lead over the grid structure of synthetic resin to coat a lead thin film around the grid structure.

Accordingly, a first object of the present invention is to produce with high producibility a grid which can considerably be reduced in weight as compared to a prior art grid by reducing the amount of lead to be used and to provide lead storage battery of prolonged life.

A second object of the present invention is to reduce the weight of the grid and assure electrical conduction between the grid and a filled active material by coating part of a grid rib structure inclusive of at least a connector lug of a battery plate with lead or lead alloy, which grid rib structure constitutes a grid structure of acid proof synthetic resin.

A third object of the present invention is to improve filling of the active material and diffusion of the electrolyte by cutting off part of an active material support rib, which forms the grid mesh and constitutes the grid rib structure together with a frame rib, to thereby prevent the grid mesh from being clogged with a lead or lead - alloy thin film, before coating part of the grid rib structure, constituting the grid structure of acid proof synthetic resin, inclusive of at least the connector lug and a portion contiguous thereto with the lead or lead alloy thin film.

According to an essential feature of the present invention, a grid structure having a similar configuration to a conventional cast grid and made of acid proof and suitably heat proof synthetic resin such as for example polypropylene or polypropylene mixed with glass fibers to form fiber-reinforced plastic is immersed for a short time in molten pure lead or lead alloy which is heated to temperatures above the melting point under temperature control and thereafter pulled up to coat a pure lead or lead alloy thin film on the surface of the grid structure. Subsequently, the grid structure coated with the thin film is fully cooled by blasting cooling air or water to form a composite grid of lead and polypropylene.

To explain the principle of the invention, when the grid structure of polypropylene is immersed in molten lead or lead alloy, part of molten lead or lead alloy contiguous to the contour of the polypropylene grid structure is instantaneously deprived of heat by the polypropylene and solidified. By pulling up the grid structure at this moment, a lead or lead alloy thin film is formed on the surface of the grid structure.

Accordingly, when the time for the immersion of the polypropylene grid structure is prolonged, not only is the polypropylene melted but also the lead or lead alloy once solidified is heated by the surrounding molten lead or lead alloy to temperatures above the melting point and is remelted, resulting i failure to form a lead or lead alloy thin film. Conversely, within an excessively short time, lead around the synthetic resin grid structure will fail to solidify. The results of experiments conducted by the inventors of the present application show that the time for the immersion of the grid structure in molten lead or lead alloy is preferably 0.1 to 1 second. When the molten lead has excessively high temperatures, the coating of a lead thin film is prevented as in the case of the prolonged-time immersion. With the time for immersion fixed, it is general that as the temperature of the molten lead increases, so the thickness of the lead thin film decreases and conversely as the temperature decreases, so the thickness increases. Experimental results show that the temperature range of molten lead was preferably 327° to 350° C. The lead alloy may include lead/antimony type alloy and lead/tin type alloy. Since the lead alloy has a lower melting point than that of pure lead, a lead alloy thin film may be coated on the surface of the grid structure at lower temperatures than the aforementioned temperature range. The molten lead alloy may be poured over the synthetic resin grid structure to attain the same effect as that obtained when the grid structure is immersed in the molten lead alloy. Polypropylene used as the material for the grid structure of acid proof synthetic resin may be replaced with thermoplastic resin such as polyethylene, polyvinyl chloride or thermo-setting resin such as phenolic resin. When aiming at a reduction of weight, an inorganic material such as titanium, graphite or glass which is light than lead alloy may substitute for synthetic resin. The grid structure may selectively have a stamped square or circular mesh pattern or an expanded diamond-shape mesh pattern in accordance with intended usage and applications.

BRIEF DESCRIPTION OF THE DRAWINGS

The other objects, features and advantages of the present invention will become apparent from the following detailed description of the invention taken in conjunction with the accompanying drawings, in which:

FIG. 7 is a plane views of a grid wherein part of the FIG. 6 grid structure inclusive of a connector lug is coated with lead or lead alloy;

FIG. 8 is a plane view showing another configuration of the synthetic resin grid structure;

FIG. 9 illustrates at sections I through III a sectional view on line A—A', a sectional view on line B—B' and a sectional view on line C—C' of the grid structure shown in FIG. 8

FIG. 10 shows a plane view wherein a number of synthetic resin grid structures suitable for mass production are united to form a panel; and FIG. 11 is a graph showing the relation between heating temperature of pure lead, time for immersion of the synthetic resin grid structure in molten pure lead and thickness of lead coating.

DESCRIPTION OF PREFERRED EMBODIMENTS

The present invention will now be described by way of example.

Figure 1:
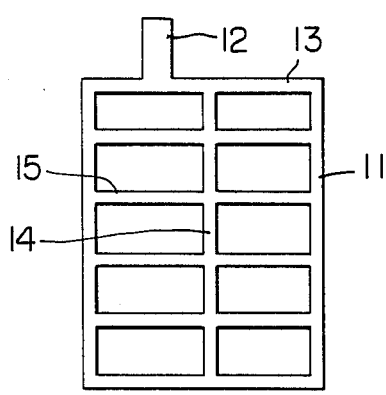
FIG. 1 is a plane view showing a basic grid structure of synthetic resin according to the present invention.

Referring now to FIG. 1, there is shown a grid structure 11 made of synthetic resin. The grid structure is formed by injection moulding of a pellet containing polypropylene as a main constituent and glass fibers mixed thereto by 30 weight %. Glass fibers each having a diameter of 12 $\mu$m and a short length of about 3 mm are used to enhance uniform distribution of the glass fibers in the pellet and reinforcement effect. Thanks to the inclusion of the glass fibers, the grid structure mainly containing polypropylene can be improved in its physical characteristics of both heat resistance properties and rigidity. A frame rib 13 has a portion which is integral with a connector lug 12. A longitudinal rib 14 and a lateral rib 15 define an active material support rib. The support rib is more slender and thinner than the surrounding frame rib 13. The frame rib 13 and the support rib constitute a grid rib structure which is a basic structure of the grid structure.

This fiber-reinforced plastic type of polypropylene mixed with glass fibers is superior to pure polypropylene in the following points:

(A) Heat resistance properties

Thermal deformation temperatures change with the amount of mixed glass fibers. While the thermal deformation temperature of polypropylene without glass fibers mixed is 95° C., polypropylene mixed with glass fibers by 30 weight % has a thermal deformation temperature of about 150° C. which is sufficient to prevent the grid structure immersed in molten lead or lead alloy from being deformed.

(B) Rigidity

While pure polypropylene without glass fibers 15 mixed has a tension strength of 400 Kg/cm$^2$, polypropylene mixed with glass fibers has a tension strength of 1000 Kg/cm$^2$. Thus, a panel formed by uniting a number of grid structures as will be described later can be prevented from being deformed when it is suspended, the grid structure can be prevented from being deformed during filling process of a paste active material, and the grid structure can be freed from damage during handling.

(C) Thermal constrictive deformation

While pure polypropylene has a coefficient of linear expansion of $12 \times 10^{-5}$ cm/cm.° C., polypropylene mixed with glass fibers has a coefficient of linear expansion of $1.5 \times 10^{-5}$ cm/cm.° C. Thus, the thermal constrictive deformation after injection moulding can be reduced to ensure that dimensional accuracy of the grid structure can be improved, the problem of formation of a thin film which clogs the grid mesh when the grid structure is immersed in molten lead or lead alloy can be mitigated, and uniformity of the amount of the paste active material to be filled can be improved. Further, exfoliation of the lead or lead alloy film coating from the grid structure which tends to occur owing to changes in temperature in a storage battery in use can also be prevented.

(D) Acid resistance and oxidization resistance properties

Polypropylene and glass fibers both have excellent acid resistance and oxidization resistance properties and have no adverse influence upon battery performances.

Figure 2:
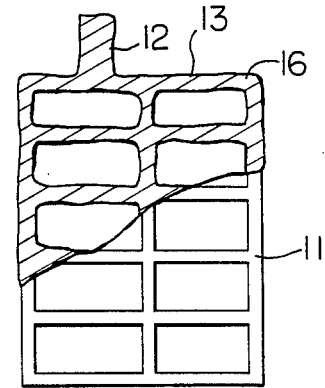
FIG. 2 shows a plane view wherein part of a grid rib structure, constituting the FIG. 1 grid structure, inclusive of a connector lug is coated with lead or lead alloy.
Figure 3:
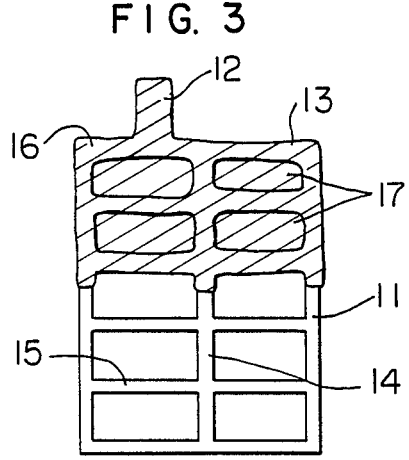
FIG. 3 shows a plane view wherein the grid mesh is clogged with a lead or lead alloy thin film when coating the grid structure with lead or lead alloy.

Independently of the grid structure as shown in FIG. 1, molten lead is prepared by heating pure lead having a melting point of 327° C. under temperature control to 332±2° C. effected by on-off controlling a heat insulation heater. The grid structure 11 is immersed in the molten lead with the connector lug 12 faced downwards to coat a lead film 16 on the surface of the grid structure. The time for the immersion of the grid structure 11 in the molten lead corresponding to the time for the connector lug 12 to stay in the molten lead is accurately controlled to 0.3±0.02 seconds. Thereafter, the grid structure is cooled by blasting air thereto by means of a fan, thereby producing a grid for use in a lead storage battery which is coated with the lead film 16 to a thickness of 300 μm as shown in FIG. 2.

The lead film 16 may be coated all over the grid structure, but the coating of the lead film over at least part of the grid rib structure including an upper portion of the frame rib 13 inclusive of the connector lug 12 and an upper portion of the active material support rib make it possible to collect current from the paste active material filled in the subsequent process, and can enhance reduction of weight of the battery plate.

Thickness of the lead film 16 can be controlled by adjusting the time for the grid structure 11 to be immersed in the molten lead, as shown in FIG. 11 which illustrates the correlation obtained when a 1.5 mm diameter rod of polypropylene is immersed in molten lead. In a hatched region in FIG. 11, the polypropylene rod is deformed by heating or the time for immersion is too short to coat the lead film on the surface of the polypropylene rod.

Accordingly, it is possible to control thickness of the lead film by suitably controlling the temperature of the molten lead and maintaining the immersion time within a range between 0.05 and 1.05 seconds. With a grid structure 11 of small grid mesh, however, when the grid structure is immersed in the molten lead within the permissible range of immerse time as shown in FIG. 11 to the longest extent shown, not only a lead film 16 can be coated on the grid rib structure but also lead thin film 17 is sometimes formed because of a surface tension of the molten lead, clogging the grid mesh.

The lead thin film 17 can be removed easily by postmachining, but if the lead thin film 17 remains applied and the subsequent filling process of the paste active material proceeds, the filling of the active material will be prevented by the lead thin film 17 or the diffusion of electrolyte through the battery plate will be degraded.

Figure 4:
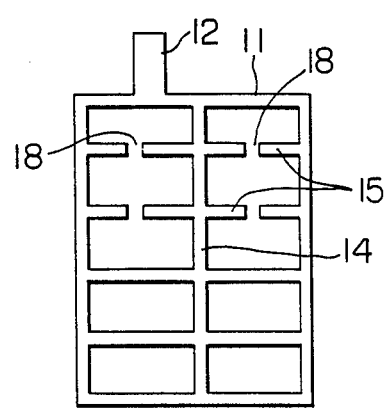
FIG. 4 shows a plane view wherein part of an active material support rib of the synthetic resin grid structure to be coated with lead or lead alloy is cut off.

To solve this problem, part of the grid rib structure to be coated with lead exclusive of the frame rib but inclusive of part of either longitudinal ribs 14 or lateral ribs 15, both the longitudinal and lateral ribs constituting the active material support ribs may be cut off as shown at 18 in FIG. 4 to partly open the grid mesh. With this construction, when the grid structure is immersed in the molten lead with the connector lug 12 faced downwards to coat the lead film 16, the partly opened grid mesh will weaken the surface tension of the molten lead so that the lead film 16 may be coated on part of the grid rib structure which needs the lead film coating as shown in FIG. 5.

When the lead thin film 17 does not clog the grid mesh, the filling of the paste active material in the subsequent process and the diffusion of electrolyte through the battery plate in contact with the electrolyte can be accomplished smoothly.

The paste active material may continuously be filled in the grid mesh from one side of the grid through a wellknown roller filling method and subsequently it may be dried in a manner well known in the art.

Figure 5:
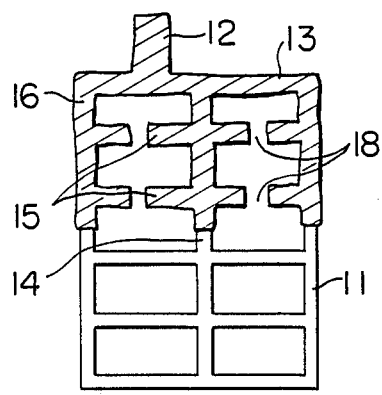
FIG. 5 shows a plane view wherein the FIG. 4 grid structure is coated with lead or lead alloy.
Figure 6:
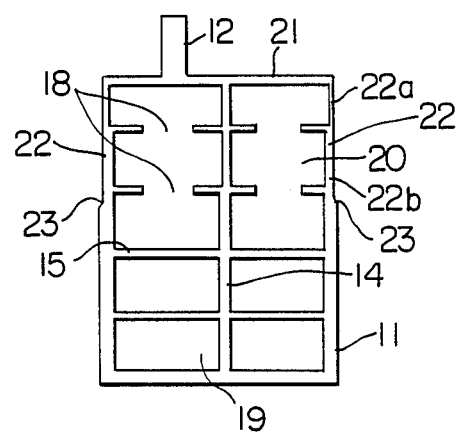
FIG. 6 is a plane view showing a preferable configuration of the synthetic resin grid structure.

In the grid structure 11 as shown in FIG. 5, an upper portion of the grid rib structure inclusive of the connector lug 12 is coated with the lead film 16. In this grid rib structure, the active material support rib consisting of the longitudinal ribs 14 and lateral ribs 15 is made more slender than the frame rib, but the slenderness does not vary from the portion to be coated with the lead film to the remaining portion not to be coated with the lead film. This construction permits, at any rate, the filling of the paste active material but for smooth filling of the active material and uniformity of the amount of active material filled, it is preferable that the portion coated with the lead film be flush with the remaining portion when the grid is completed. To this end, the grid rib structure constituting the grid structure 11 may be decreased in thickness and width at the portion to be coated with the lead film as shown in FIG. 6. In the figure, the portion which is not to be coated with the lead film is designated by 19 and the portion to be coated with the lead film by 20. Since the portion 20 to be coated with the lead film is immersed in molten lead and subjected to heat during the immersion, it is made of polypropylene mixed with glass fibers so that it may have heat resistant properties and its thickness is varied to resist against thermal deformation. A uppermost portion 21 of the frame rib has a substantially circular crosssectional area of 1.1 mm diameter when the portion 19 not coated with the lead film has a thickness of 1.7 mm and a width of 1.7 mm. A connector lug 12 integral with the uppermost portion 21 of the frame rib has then the same thickness as the diameter of the portion 21. Right and left portions 22 to be coated with the lead film which connect the uppermost portion 21 to right and left lower portions not to be coated with the lead film are each divided into an upper sub-portion 22a and a lower sub-portion 22b. The upper sub-portion 22a has the same diameter as the uppermost frame rib portion 21 and the lower sub-portion 22b has a thickness of 1.1 mm and a width of 1.4 mm with the outer side recessed relative to the frame rib portion 19 to form a shoulder 23 and with the inner side being flush with the frame rib portion 19. Consequently, the lower sub-portion 22b has substantially an elliptical cross-sectional area. In the active material support rib, a longitudinal rib 14 is more slender than the uppermost portion 1, and a lateral rib 15 has a crosssectional size which is the same as or less than that of the longitudinal rib and is partly cut off as shown at 18 to assure steady coating of the lead film over the entire surface of the portion 20 to be coated. Illustrated in FIG. 7 is a grid which is produced by immersing the grid structure 11 having the portion 20 to be coated with the lead film in molten lead and the shoulder 23 substantially disappears. The longitudinal and lateral ribs 14 and 15 of the active material support rib are also coated with the lead film but they have the original crosssectional size which is more slender than that of the uppermost portion 21, so that the active material support rib can be more slender than the frame rib. Accordingly, the paste active matrial can be readily filled in the grid mesh and electrical conduction between the active materials and between the active maerial and the connector lug can be assured.

After completion of the battery plate, the connector lug 12 is connected to a connector lug of the battery plate by welding or soldering. Therefore, the thickness of the lead film coated on the connector lug 12 should preferably be sufficiently large. To this end, front and rear surfaces of the connector lug 12 are formed with central longitudinal grooves 24 each having a depth of 0.2 mm and a width of 0.8 mm as shown in FIG. 8, thereby making easier the coating of lead on the grooves than on the remaining portion. A grid of FIG. 8 is also advantageous in that the portion not t be coated with the lead film, generally designated by 19, is improved in supporting the active material and electrical conduction between the active materials and between the active material and the connector lug can be improved. More particularly, one of the longitudinal and lateral ribs constituting the active material support rib, lateral ribs 15 herein, are staggered within the region of the portion 19 so as to decrease the degree of partitioning of the active mateial by the lateral ribs and enhance electrical conduction between the active materials in the vertical direction of the battery plate.

Crosssectional area configurations taken on lines A—A', B—B' and C—C' in FIG. 8 are shown at sections I, II and III in FIG. 9. As will be seen from section III, FIG. 9, the frame rib 11 in the portion 19 not to be coated with the lead flm has substantially an L-shaped crosssectional area with a shoulder 25, which crosssectional area can assure steady support of the paste active mateial.

With a view to facilitating mass production of the lead film, a sheet of panel 26 as shown in FIG. 10 is produced having a number of grid structures 11 of FIG. 8 each serving as a unit battery plate, 12 grid structures herein constituting two arrays of an upper array of 6 grid structures and a lower array of 6 grid structures, each grid structure being formed by injection moulding of polypropylene mixed with glass fibers. Illustrated in FIG. 10 are right and left lugs 27 for suspension, and a frame rib 28 for providing the panel with rigidity and a central rib 29 between the upper and lower arrays which play an important role in preventing constrictive deformation which would occur when injection moulding and consequently obtaining highly accurate grid structures 11. The grid structures 11 are connected with each other and with the frame ribs 28 and central rib 29 by means of connecting bands 30. Holes 31 adapted for positioning in the course of the immersion of the panel of the grid structures 11 in the molten lead fit on guide pins provided for an immersion tool. The panel 26 is first turned through 180° to take a posture inverted from that of FIG. 10 and the upper positioning holes are fitted on the guide pins. Thereafter, a portion of the panel above line X—X as viewed from FIG. 10, inclusive of connector lugs 12, is immersed in a bath of molten lead for 0.3±0.02 seconds and subsequently pulled up. The molten lead is controlled to a temperature of 332±2° C. which is higher than the melting point described previously and its free surface is constantly maintained at a constant level and removed of flating contaminants such as oxides. Thereafter, the panel is again turned through 180° to return to the posture shown in FIG. 10 and a portion of the panel below line Y—Y', inclusive of connector lugs 12, is then immersed in the bath of molten lead in a similar manner to coat the lead film. Next, the grid structures in the form of the panel partly coated with the lead film is applied to a paste filling machine, by which the paste active material is pressed and filled into the grid mesh from one side of the panel. In this manner, 12 battery plates are completed. In the application of unformed battery plate, the battery plates are separated from each other at the connecting bands 30.

In the application of formed battery plate, the panel is dried after the filling of the paste active material and thereafter one frame rib, inclusive of a connecting band 32 for electrical conduction, on the left side with respect to line Z—Z' as viewed from FIG. 10 is immersed in the molten lead to set up a path for electrical connection of the upper and lower arrays. The panel is then subjected to formation process and the respective battery plates are subsequently separated by cutting at the connecting bands 30.

The above production method for the united grid structure and battery plate can enhance mass production and efficiency of use of lead as well as dimensional accuracy of the battery plate.

In some applications, however, the dimensional accuracy of the battery plate is not regarded as important but an inexpensive battery plate which is reduced in size and weight is rather desired. In such applications, the grid structure may preferably be made of pure polypropylene or polyethylene in place of fiber-reinforced plastic type polypropylene. The grid structure thus made of synthetic resin or inorganic materials may be coated with the lead film or a lead alloy film whose coating can be controlled at lower temperatures than temperatures for the lead film.

In applications wherein temperature control for lead alloy and utilization efficiency thereof are not so critical, molten lead or lead alloy may directly be poured over surplus molten lead or lead alloy may be collected by a pan or tank for re-utilization.

In comparison with the lead or lead alloy film formed by metal spraying and having a grain boundary of fine lead particles, the lead or lead alloy film on the grid structure of the grid according to the invention is formed continuously and hence is difficult to turn into active materials and they have high intimacy to the grid structure and high resistance to exfoliation. Further, the coated film is not porous and has a low electrical resistance, thereby considerably contributing to improvement in characteristics and life of the battery plate.

What is claimed is:
1. A method for production of a grid for a lead storage battery, comprising the steps of:
   (i) preparing a grid structure including an integral connector lug, said grid structure being made of acid proof synthetic resin;
   (ii) immersing the grid structure with said connector lug into molten lead or lead alloy to coat part of the grid rib structure inclusive of the connector lug and the portion contiguous thereto with molten lead or lead alloy, said part of the grid rib structure which is coated with the lead or lead alloy comprising part of a frame rib and an active material support rib forming said grid rib structure, and the active material support rib being partly cut off to partly open the grid structure; and
   (iii) cooling the grid structure to form a lead or lead alloy film coated thereon.
2. A method for production of a grid for a lead storage battery accoding to claim 1 wherein said grid struc- ture is made of acid proof synthetic resin mixed with glass fibers.

3. A method for production of a grid for a lead storage battery according to claim 2 wherein said grid structure is made of polypropylene mixed with glass fibers.

4. A method as in claim 1 wherein said grid structure is immersed into molten lead or lead alloy with the connector lug facing toward the molten lead or lead alloy.

5. A method for production of a grid for a lead storage battery according to claim 4 wherein a number of grid structures unite with each other to form a panel, and the panel is immersed in a bath of the molten lead or lead alloy.

6. A method for production of a grid for a lead storage battery according to claim 1, wherein the time for the grid structure to be immersed in the molten lead or lead alloy and the level of the free surface of the molten lead or lead alloy are controlled in accordance with a height and a thickness of the lead or lead alloy film to be obtained.

7. A method for production of a grid for a lead storage battery according to claim 4 wherein the temperature of the molten lead or lead alloy is maintained at 327° to 350° C. and the grid structure is held in contact with the molten lead or lead alloy for 0.05 to 1.05 seconds.

8. A method for production of a grid for a lead storage battery according to claim 1 wherein the thickness of the lead or lead alloy film is larger at the connector lug of the grid structure than at the remaining portion thereof.

* * * * *